US010133885B2

(12) United States Patent
Van Horn et al.

(10) Patent No.: US 10,133,885 B2
(45) Date of Patent: *Nov. 20, 2018

(54) METHOD OF AND SYSTEM FOR READING VISIBLE AND/OR INVISIBLE CODE SYMBOLS IN A USER-TRANSPARENT MANNER USING VISIBLE/INVISIBLE ILLUMINATION SOURCE SWITCHING DURING DATA CAPTURE AND PROCESSING OPERATIONS

(71) Applicant: Metrologic Instruments, Inc., Blackwood, NJ (US)

(72) Inventors: Erik Van Horn, Ocean View, NJ (US); Sean Philip Kearney, Marlton, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 350 days.

This patent is subject to a terminal disclaimer.

(21) Appl. No.: 13/852,052

(22) Filed: Mar. 28, 2013

(65) Prior Publication Data

US 2013/0193212 A1 Aug. 1, 2013

Related U.S. Application Data

(63) Continuation of application No. 12/966,256, filed on Dec. 13, 2010, now Pat. No. 8,408,468.

(51) Int. Cl.
*G06K 7/10* (2006.01)
*G06K 7/00* (2006.01)
(Continued)

(52) U.S. Cl.
CPC ....... *G06K 7/0004* (2013.01); *G06K 7/10574* (2013.01); *G06K 7/10584* (2013.01);
(Continued)

(58) Field of Classification Search
CPC .. G06K 7/12; G06K 7/10564; G06K 7/10574; G06K 7/10584; G06K 7/10732;
(Continued)

(56) References Cited

U.S. PATENT DOCUMENTS

| 4,751,396 A | 6/1988 | Daigle et al. |
| 6,203,069 B1 | 3/2001 | Outwater et al. |

(Continued)

FOREIGN PATENT DOCUMENTS

| CA | 2375577 A1 | 9/2003 |
| DE | 10309659 A | 1/2001 |

(Continued)

OTHER PUBLICATIONS

Examination Report in EP Application No. 11192875.0-2210 (now Patent EP2463804, dated Mar. 21, 2012, 5 pages.
(Continued)

*Primary Examiner* — Steven S Paik
*Assistant Examiner* — April Taylor
(74) *Attorney, Agent, or Firm* — Additon, Higgins & Pendleton, P.A.

(57) ABSTRACT

A digital imaging based symbol reading system has the capacity to automatically read both visible and invisible symbols in the same application environment. Typically, the system reads the symbols in a user-transparent manner. The system may employ visible/invisible illumination switching during operation. The system may include LED illumination sources. A method for reading both visible and invisible symbols using a single device is also disclosed.

20 Claims, 8 Drawing Sheets

(51) Int. Cl.
*G06K 7/12* (2006.01)
*G06K 7/14* (2006.01)

(52) U.S. Cl.
CPC ..... *G06K 7/10732* (2013.01); *G06K 7/10821* (2013.01); *G06K 7/12* (2013.01); *G06K 7/1404* (2013.01); *G06K 2207/1011* (2013.01); *G06K 2207/1012* (2013.01); *G06K 2207/1018* (2013.01)

(58) Field of Classification Search
CPC ............ G06K 7/10821; G06K 7/1404; G06K 2207/1012; G06K 2207/1018
USPC ............ 235/462.01, 462.07, 462.09, 462.25, 235/462.31, 462.32, 462.41–462.45, 235/462.48, 472.01
See application file for complete search history.

(56) References Cited

U.S. PATENT DOCUMENTS

| | | | |
|---|---|---|---|
| 6,612,494 B1 | 2/2003 | Outwater | |
| 6,538,820 B2 | 3/2003 | Fohl et al. | |
| 6,619,549 B2 | 9/2003 | Zhu et al. | |
| 6,629,640 B2* | 10/2003 | Dorris et al. | ............ 235/462.01 |
| 6,839,128 B2 | 1/2005 | Premjeyanth et al. | |
| 7,036,735 B2 | 5/2006 | Hepworth et al. | |
| 7,045,804 B2 | 5/2006 | Merry et al. | |
| 7,046,346 B2 | 5/2006 | Premjeyanth et al. | |
| 7,128,266 B2 | 10/2006 | Zhu et al. | |
| 7,234,641 B2 | 6/2007 | Olmstead | |
| 7,420,153 B2 | 9/2008 | Palmer et al. | |
| 7,527,207 B2 | 5/2009 | Acosta et al. | |
| 7,546,952 B2 | 6/2009 | Knowles et al. | |
| 7,575,170 B2 | 8/2009 | Knowles et al. | |
| 7,614,560 B2 | 11/2009 | Knowles et al. | |
| 7,715,613 B2 | 5/2010 | Dobbs et al. | |
| 7,744,130 B2 | 6/2010 | Zazzu et al. | |
| 7,841,533 B2 | 11/2010 | Kotlarsky et al. | |
| 7,878,407 B2 | 2/2011 | Knowles et al. | |
| 8,042,740 B2 | 10/2011 | Knowles et al. | |
| 8,408,468 B2 | 4/2013 | Van Horn et al. | |
| 2002/0015145 A1 | 2/2002 | Numata | |
| 2006/0113386 A1 | 6/2006 | Olmstead | |
| 2008/0041957 A1 | 2/2008 | Kotlarsky et al. | |
| 2008/0063252 A1 | 3/2008 | Dobbs et al. | |
| 2008/0283611 A1 | 11/2008 | Knowles et al. | |
| 2008/0290173 A1 | 11/2008 | Kotlarsky et al. | |
| 2008/0314985 A1 | 12/2008 | Kotlarsky et al. | |
| 2009/0065584 A1 | 3/2009 | Knowles et al. | |
| 2009/0101718 A1* | 4/2009 | Knowles et al. | ........ 235/462.42 |
| 2009/0101719 A1* | 4/2009 | Knowles et al. | ........ 235/462.42 |
| 2009/0108074 A1* | 4/2009 | Vinogradov | ............. 235/462.42 |

FOREIGN PATENT DOCUMENTS

| | | |
|---|---|---|
| EP | 2463804 A1 | 6/2012 |
| WO | 0180512 A2 | 10/2001 |
| WO | 2006060785 A3 | 6/2006 |

OTHER PUBLICATIONS

European Search Report Application No. 111922875 (now Patent EP2463804) dated Mar. 7, 2012, 3 pages.

* cited by examiner

METHOD OF AND SYSTEM FOR READING VISIBLE AND/OR INVISIBLE CODE SYMBOLS IN A USER-TRANSPARENT MANNER USING VISIBLE/INVISIBLE ILLUMINATION SOURCE SWITCHING DURING DATA CAPTURE AND PROCESSING OPERATIONS

CROSS-REFERENCE TO PRIORITY APPLICATION

The present application is a continuation of U.S. patent application Ser. No. 12/966,256 for a Method Of And System For Reading Visible And/Or Invisible Code Symbols In A User-Transparent Manner Using Visible/Invisible Illumination Source Switching During Data Capture And Processing Operations, filed Dec. 13, 2010 (and published Jun. 14, 2012 as U.S. Patent Application Publication No. 2012/0145788), now U.S. Pat. No. 8,408,468. Each of the foregoing patent application, patent publication, and patent is hereby incorporated by reference in its entirety.

BACKGROUND

Field of Disclosure

The present disclosure relates to new and improved methods of and systems for reading bar code symbols using visible and invisible sources of illumination during data capture and processing operations.

Brief Description of the State of the Art

Today, bar code symbols and labels are used in diverse applications. Typically, a bar code label is printed on a light reflective substrate (e.g. paper) with an ink that is absorptive in the visible-band portion of the electromagnetic spectrum. In such applications, the bar code symbol reader must have a visible source of light (e.g. VLD or visible LED) for reading the visible bar code symbols.

However, in many security-type applications, where access and admission cards and tickets are given out, the security cards bear bar code symbols that are printed with infra-red inks, i.e. inks that reflect only light in the infra-red band portion of the electromagnetic spectrum. In such specialized applications, the bar code symbol reader must have an infrared (IR) source of light (e.g. IR-LD or IR-LED) for reading such IR-based bar code symbols.

A variety of methods have been developed and disclosed in the following Patents and Patent Application Publications to read bar code symbols using visible and/or visible radiation for object illumination purposes, in particular: U.S. Pat. No. 7,036,735 to Hepworth et al., and U.S. Publication Nos. 2006/0113386, 20080283611A1 and 20090065584A1.

While the digital imaging-based and laser-based systems disclosed in these prior art patents possess the capacity to read visible and invisible bar code symbols, in diverse environments, such system are more complex and costly to manufacture than desired in most applications where there is a practical need to read both visible and invisible bar code symbols, but with a greater sense of economy.

In short, there is great need in the art for new and improved ways of simply and reliably reading bar code symbols using either visible or invisible illumination, in the same application environment, avoiding the shortcomings and drawbacks of the prior art apparatus and methodologies.

OBJECTS AND SUMMARY

A primary object of the present disclosure is to provide a new and improved method of and apparatus for reading bar code symbols using either visible or invisible illumination, avoiding the shortcomings and drawbacks of prior apparatus and methodologies.

Another object of the present invention is to provide a digital imaging based bar code symbol reading system having the capacity to automatically read both visible and invisible bar code symbols in the same application environment, without the complexities and cost presented by prior art techniques and technologies.

Another object of the present invention is to provide an improved method of automatically reading both visible and invisible bar code symbols in the same application environment, using a single digital imaging device that is simple to manufacture and operate.

Another object of the present invention is to provide a new and improved digital-imaging based system for reading visible and/or invisible bar code symbols in a user-transparent manner using visible/invisible illumination switching during digital image capture and processing operations, without the complexities presented by prior art techniques and technologies.

Another object of the present invention is to provide a new and improved laser based scanning system for reading visible and/or invisible bar code symbols in a user-transparent manner using visible/invisible illumination switching during scan data capture and processing operations, without the complexities presented by prior art techniques and technologies.

Another object of the present invention is to provide an improved method of reading both visible and invisible bar code symbols during a single scanning session in most application environments, using a single laser scanning device that is both simple to manufacture and operate.

Another object of the present invention is to provide an improved method of reading both bar code symbols using infrared (IR) illumination which increases the contrast of scanned and imaged security-type bar code symbols printed with IR-reflective ink.

Another object of the present invention is to provide a hand-supportable digital imaging system for reading security-type IR-printed bar code symbols on admission and like passes, wherein such security code symbols appear invisible to the unaided human eye, but which produces decodable black and white (B/W) images of such security codes when imaged using IR illumination.

These and other objects will become apparent hereinafter and in the Claims.

BRIEF DESCRIPTION OF THE DRAWINGS

In order to more fully understand the Objects, the following Detailed Description of the Illustrative Embodiments should be read in conjunction with the accompanying Drawings, wherein.

DETAILED DESCRIPTION OF THE ILLUSTRATIVE EMBODIMENTS

Referring to the figures in the accompanying Drawings, the illustrative embodiments of the bar code symbol reading system and method of the present disclosure will be described in great detail, wherein like elements will be indicated using like reference numerals.

Hand-Supportable Digital-Imaging Bar Code Symbol Reading System of the Illustrative Embodiment Referring now to FIGS. 1 through 3, an illustrative embodiment of the hand-supportable digital-imaging bar code symbol reading system 1 will be described in detail.

Figure 1:
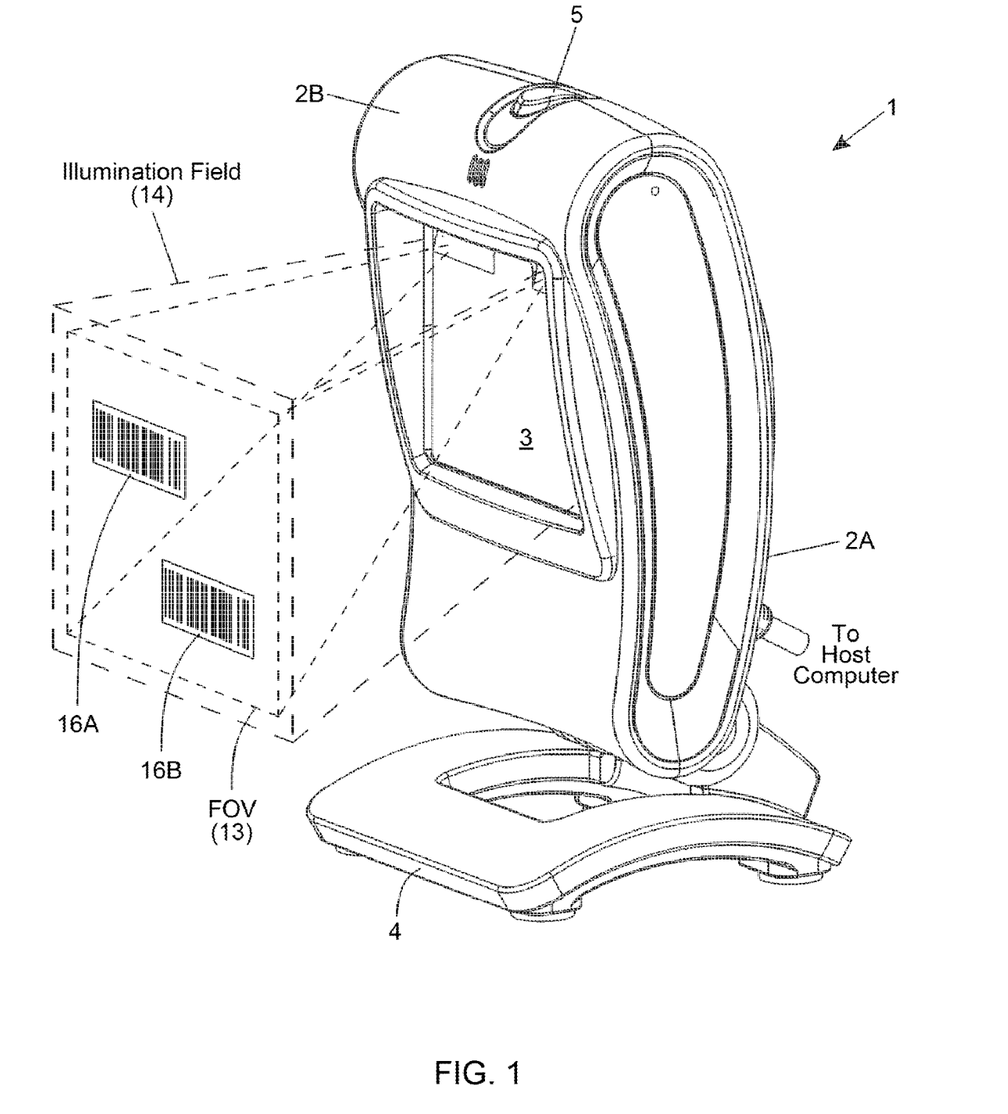
FIG. 1 is a perspective view of an illustrative embodiment of the hand-supportable digital-imaging based bar code symbol reading system, having the capacity to automatically read both visible and invisible bar code symbols, in the same application environment, in a simple and reliable manner, in diverse application environments.
Figure 2A:
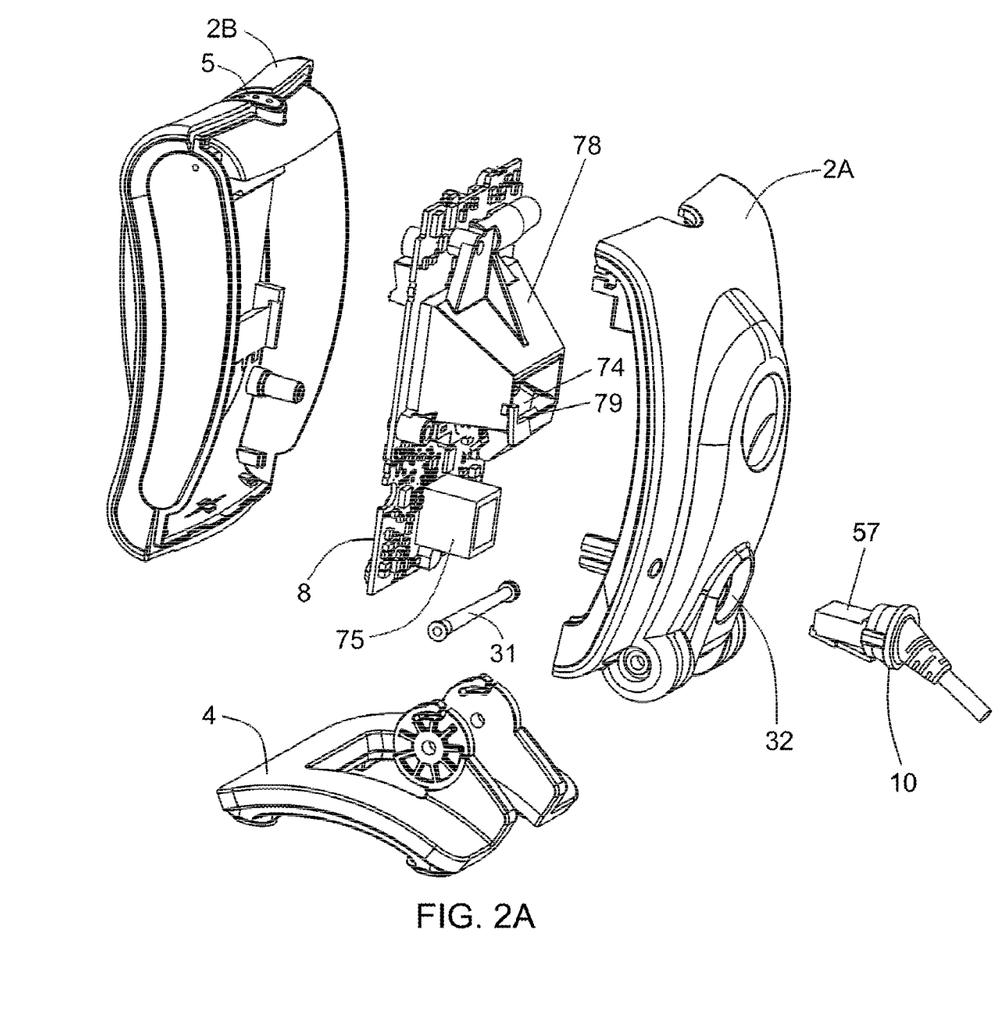
FIG. 2A is a first perspective exploded view of the digital-imaging based bar code symbol reading system of the illustrative embodiment depicted in FIG. 1, showing its printed circuit board assembly arranged between the front and rear portions of the system housing, with the hinged base being pivotally connected to the rear portion of the system housing by way of an axle structure.
Figure 2B:
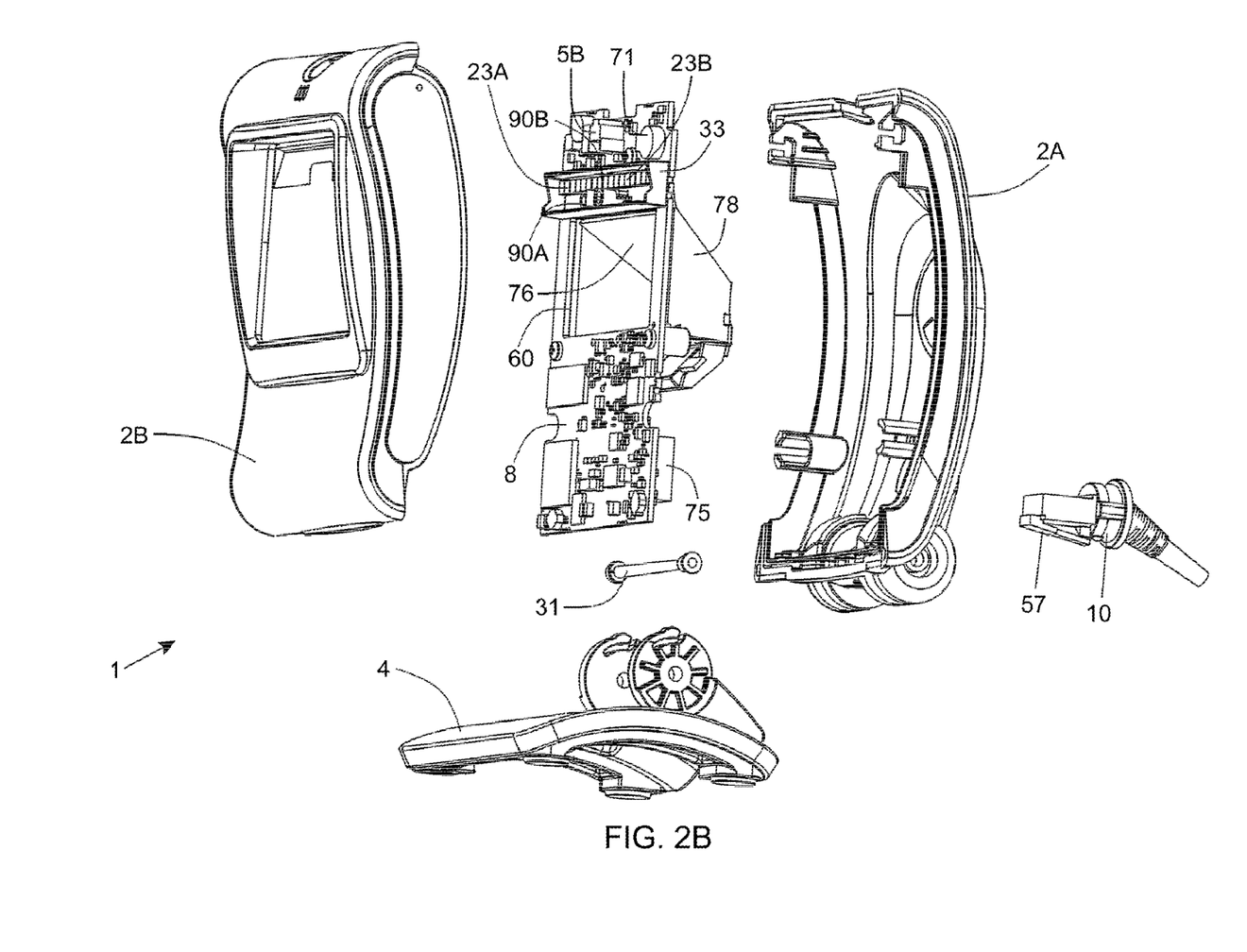
FIG. 2B is a second perspective/exploded view of the digital-imaging based bar code symbol reading system of the illustrative embodiment shown in FIG. 1.

As shown in FIGS. 1, 2A and 2B, the digital-imaging bar code symbol reading system of the illustrative embodiment 1 comprises: a hand-supportable housing 2 having (i) a front housing portion 2B with a window aperture 6 and an imaging window panel 3 installed therein; and (ii) a rear housing portion 2A. As shown, a single PC board based optical bench 8 (having optical subassemblies mounted thereon) is supported between the front and rear housing portions 2A and 2B which, when brought together, form an assembled unit. A base portion 4 is connected to the assembled unit by way of a pivot axle structure 31 that passes through the bottom portion of the imager housing and the base portion so that the hand-supportable housing and base portion are able to rotate relative to each other. The host/imager interface cable 10 passes through a port 32 formed in the rear of the rear housing portion, and interfaces with connectors mounted on the PC board 8.

Figure 3:
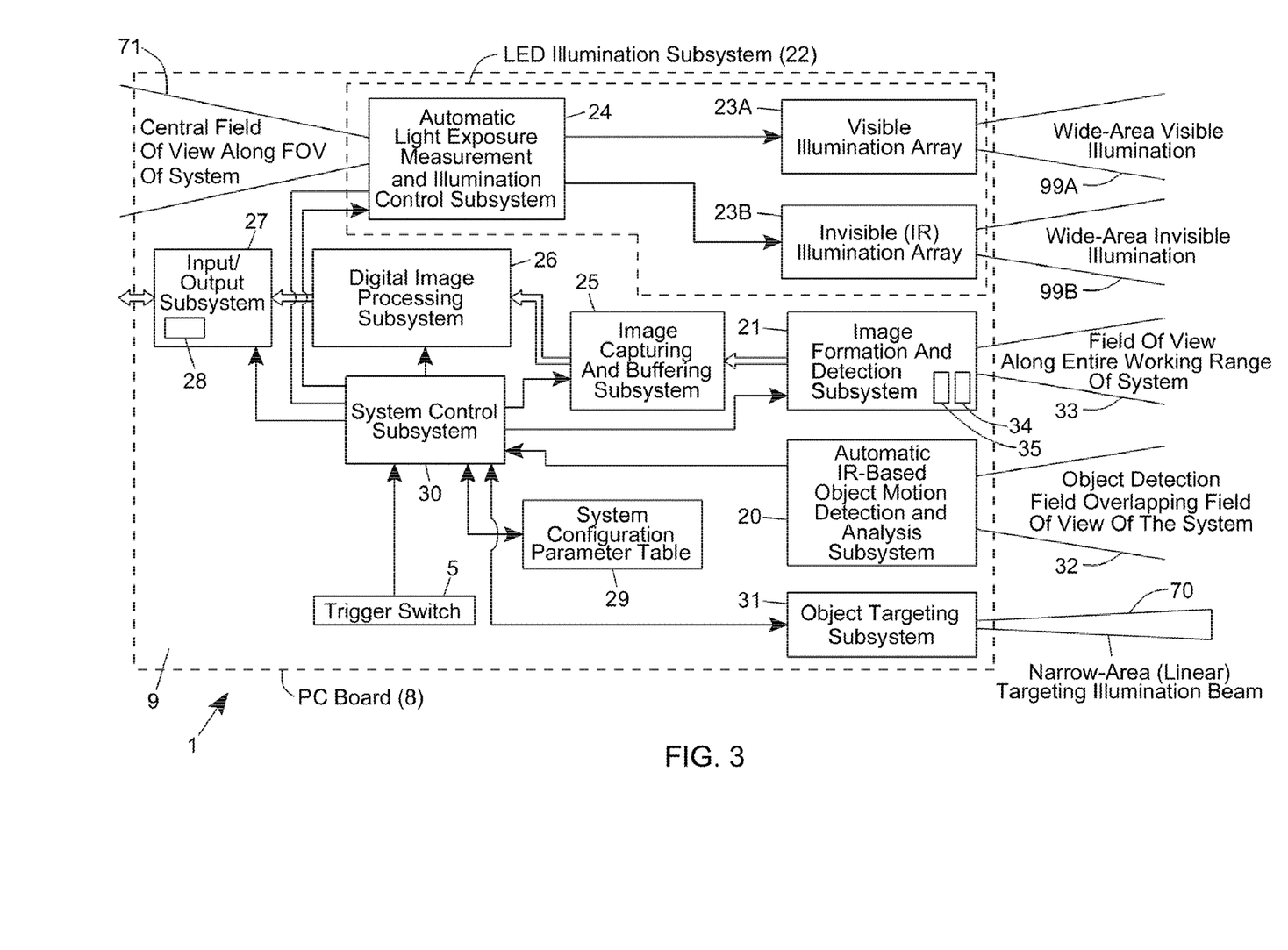
FIG. 3 is a schematic block diagram describing the major system components of the digital-imaging based bar code symbol reading system illustrated in FIGS. 1 through 2B.

As shown in FIG. 3, the digital-imaging based code symbol reading system 1 comprises a number of subsystem components, namely: a digital image formation and detection (i.e. camera) subsystem 21 having image formation (camera) optics 34 for producing a field of view (FOV) upon an object to be imaged and a CMOS or like area-type image detection array 35 for detecting imaged light reflected off the object during illumination operations in an image capture mode in which at least a plurality of rows of pixels on the image detection array are enabled; a LED-based multi-mode illumination subsystem 22 employing a single LED illumination array 23 comprising visible and invisible (infrared) LEDs 23A and 23B, alternatively interspaced along a linear dimension, in the illustrative embodiment (although other arrangements are possible); a narrow-band transmission-type optical filter 40, realized within the hand-supportable and detected by the image detection array 35, for transmitting illumination reflected from the illuminated object, while all other components of ambient light are substantially rejected; an object targeting illumination subsystem 31 as described hereinabove; an IR-based object detection subsystem 20 for producing an IR-based object detection field 32 within the FOV of the image formation and detection subsystem 21; an automatic light exposure measurement and illumination control subsystem 24 for controlling the operation of the LED-based illumination subsystem 22 including the operation of said visible and invisible illumination arrays within said multi-mode illumination subsystem; an image capturing and buffering subsystem 25 for capturing and buffering 2-D images detected by the image formation and detection subsystem 21: a digital image processing subsystem 26 for processing 2D digital images captured and buffered by the image capturing and buffering subsystem 25 and reading 1D and/or 2D bar code symbols represented therein; and an input/output subsystem 27 for outputting processed image data and the like to an external host system or other information receiving or responding device; and a system control subsystem 30 integrated with the subsystems above, for controlling and/or coordinating these subsystems during system operation.

The primary function of the object targeting subsystem 31 is to automatically generate and project a visible linear-targeting illumination beam 70 across the central extent of the FOV of the system in response to either (i) the automatic detection of an object during hand-held imaging modes of system operation, or (ii) manual detection of an object by an operator when s/he manually actuates the manual actuatable trigger switch 5. In order to implement the object targeting subsystem 31, the OCS assembly 78 also comprises a fourth support structure for supporting the pair of beam folding mirrors above a pair of aperture slots, which in turn are disposed above a pair of visible LEDs arranged on opposite sides of the FOV optics 34 so as to generate a linear visible targeting beam 70 that is projected off the second FOV folding 75 and out the imaging window 3, as shown and described in detail in U.S. Patent Publication No. US20080314985 A1, incorporated herein by reference in its entirety.

The primary function of the object motion detection and analysis subsystem 20 is to automatically produce an object detection field 32 within the FOV 33 of the image formation and detection subsystem 21, to detect the presence of an object within predetermined regions of the object detection field 32, as well as motion and velocity information about the object therewithin, and to generate control signals which are supplied to the system control subsystem 30 for indicating when and where an object is detected within the object detection field of the system. As shown in FIG. 2B, IR LED 90A and IR photodiode 90B are supported in the central lower portion of the optically-opaque structure 33, below the linear array of visible and invisible LEDs, 23A and 23B, respectively. The IR LED 90A and IR photodiode 90B are used to implement the automatic IR-based object motion detection and analysis subsystem 20.

The image formation and detection (i.e. camera) subsystem 21 includes image formation (camera) optics 34 for providing a field of view (FOV) 33 upon an object to be imaged and a CMOS area-type image detection array 35 for detecting imaged light reflected off the object during illumination and image acquisition/capture operations.

Figure 4:
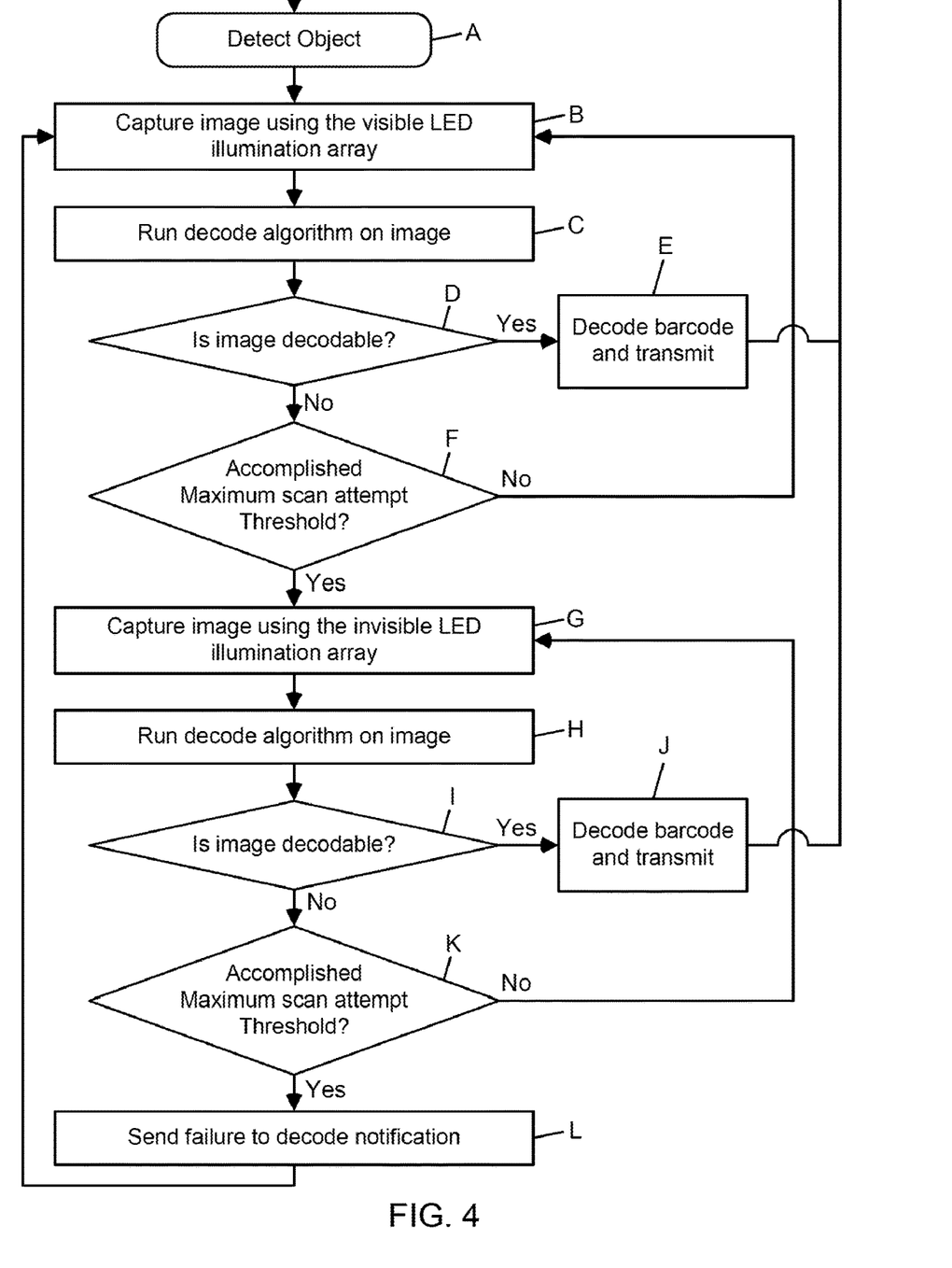
FIG. 4 is flow chart describing the primary steps carried out in the digital-imaging based bar code symbol reading system of FIG. 1, wherein visible and invisible sources of LED illumination are automatically and selectively employed during object illumination and imaging operations, as required to achieve the successful reading of either a visible or invisible bar code symbol within the field of view (FOV) of the system.

The primary function of the LED-based multi-mode illumination subsystem 22 is to produce either (i) a visible wide-area illumination field 36A from the visible LED array 23A when subsystem 22 is operating in its visible illumination mode of operation, or (ii) a invisible (e.g. infrared) wide-area illumination field 36B from the infra-red LED array 23B when subsystem 22 is operating in its invisible/IR illumination mode of operation, wherein the mode of operation depends on the results of real-time analysis performed by the system control subsystem 30 while carrying out its bar code symbol reading method of operation, specified in FIG. 4. Notably, each field of illumination has a narrow optical-bandwidth and is spatially confined within the FOV of the image formation and detection subsystem 21 during modes of illumination and imaging, respectively. This arrangement is designed to ensure that only narrow-band illumination transmitted from the multi-mode illumination subsystem 22, and reflected from the illuminated object, is ultimately transmitted through a narrow-band transmission-type optical filter subsystem 40 within the system and reaches the CMOS area-type image detection array 35 for detection and processing, whereas all other components of ambient light collected by the light collection optics are substantially rejected at the image detection array 35, thereby providing improved SNR, thus improving the performance of the system.

The narrow-band transmission-type optical filter subsystem 40 is realized by (1) a high-pass (i.e. red-wavelength reflecting) filter element embodied within at the imaging window 3, and (2) a low-pass filter element mounted either before the CMOS area-type image detection array 35 or anywhere after beyond the high-pass filter element, including being realized as a dichroic mirror film supported on at least one of the FOV folding mirrors 74 and 75, shown in FIGS. 2A and 2B.

As shown in FIG. 2B, the linear array of alternatively spaced visible and IR LEDs 23A and 23B, respectively, 23B is aligned with an illumination-focusing lens structure 130 embodied or integrated within the upper edge of the imaging window 3. Also, the light transmission aperture 60 formed in the PC board 8 is spatially aligned within the imaging window 3 formed in the front housing portion 2A. The function of illumination-focusing lens structure 130 is to focus illumination from the single linear array of LEDs 23, and to uniformly illuminate objects located anywhere within the working distance of the FOV of the system.

As shown in FIG. 2B, an optically-opaque light ray containing structure 33 is mounted to the front surface of the PC board 8, about the linear array of LEDs 23. The function of the optically-opaque light ray containing structure 33 is to prevent transmission of light rays from the LEDs to any surface other than the rear input surface of the illumination-focusing lens panel 3, which uniformly illuminates the entire FOV of the system over its working range. When the front and rear housing panels 2B and 2A are joined together, with the PC board 8 disposed there between, the illumination-focusing lens panel 3 sits within slanted cut-aways formed in the top surface of the side panels, and illumination rays produced from the linear array of LEDs 23A and 23B are either directed through the rear surface of the illumination-focusing lens panel 3 or absorbed by the black colored interior surface of the structure 133.

As shown in FIGS. 2A and 2B the optical component support (OCS) assembly 78 comprises: a first inclined panel for supporting the FOV folding mirror 74 above the FOV forming optics, and a second inclined panel for supporting the second FOV folding mirror 75 above the light transmission aperture 60. With this arrangement, the FOV employed in the image formation and detection subsystem 21, and originating from optics supported on the rear side of the PC board, is folded twice, in space, and then projected through the light transmission aperture and out of the imaging window of the system.

The automatic light exposure measurement and illumination control subsystem 24 performs two primary functions: (1) to measure, in real-time, the power density [joules/cm] of photonic energy (i.e. light) collected by the optics of the system at about its image detection array 35, and to generate auto-exposure control signals indicating the amount of exposure required for good image formation and detection; and (2) in combination with the illumination array selection control signal provided by the system control subsystem 30, to automatically drive and control the output power of the visible and invisible LED arrays 23A and 23B, respectively, employed in the multi-mode illumination subsystem 22, so that objects within the FOV of the system are optimally exposed to either visible or invisible LED-based illumination, as determined by the system control subsystem 30, and optimal images are formed and detected at the image detection array 35. The OCS assembly 78 also comprises a third support panel for supporting the parabolic light collection mirror segment 79 employed in the automatic exposure measurement and illumination control subsystem 24. Using this mirror 78, a narrow light collecting FOV is projected out into a central portion of the wide-area FOV 33 of the image formation and detection subsystem 21 and focuses collected light onto photo-detector 81, which is operated independently from the area-type image sensing array, schematically depicted in FIG. 3 by reference numeral 35.

The primary function of the image capturing and buffering subsystem 25 is (1) to detect the entire 2-D image focused onto the 2D image detection array 35 by the image formation optics 34 of the system, (2) to generate a frame of digital pixel data for either a selected region of interest of the captured image frame, or for the entire detected image, and then (3) buffer each frame of image data as it is captured. Notably, in the illustrative embodiment, the system has both single-shot and video modes of imaging. In the single shot mode, a single 2D image frame (31) is captured during each image capture and processing cycle, or during a particular stage of a processing cycle. In the video mode of imaging, the system continuously captures frames of digital images of objects in the FOV. These modes are specified in further detail in U.S. Patent Application Publication No. US20080314985 A1, incorporated herein by reference in its entirety.

The primary function of the digital image processing subsystem 26 is to process digital images captured and buffered by the image capturing and buffering subsystem 25, under the control of the system control subsystem 30 so that the method of bar code symbol reading described in FIG. 4 is carried out in successful manner. Such image processing operations include the practice of image-based bar code decoding methods, as described in U.S. Pat. No. 7,128,266, incorporated herein by reference.

The primary function of the input/output subsystem 27 is to support universal, standard and/or proprietary data communication interfaces with external host systems and devices, and output processed image data and the like to such external host systems or devices by way of such interfaces. Examples of such interfaces, and technology for implementing the same, are given in U.S. Pat. Nos. 6,619, 549 and 6,619,549, incorporated herein by reference in their entirety.

The primary function of the system control subsystem 30 is to provide some predetermined degree of control, coordination and/or management signaling services to each subsystem component integrated within the system, as shown, while carrying out the bar code symbol reading method described in FIG. 4. While this subsystem can be implemented by a programmed microprocessor, in the preferred embodiments, this subsystem is implemented by the three-tier software architecture supported on micro-computing platform as described in U.S. Pat. No. 7,128,266 and elsewhere hereinafter.

The primary function of the manually-activatable trigger switch 5A integrated with the housing is to enable the user, during a manually-triggered mode of operation, to generate a control activation signal (i.e. trigger event signal) upon manually depressing the same (i.e. causing a trigger event), and to provide this control activation signal to the system control subsystem 30 for use in carrying out its complex system and subsystem control operations, described in detail herein.

The primary function of the system configuration parameter table 29 in system memory is to store (in non-volatile/persistent memory) a set of system configuration and control parameters (i.e. SCPs) for each of the available features and functionalities, and programmable modes of supported system operation, and which can be automatically read and used by the system control subsystem 30 as required during its complex operations.

Notably, such SCPs can be dynamically managed as taught in great detail in copending U.S. Patent No. US20080314985 A1, incorporated herein by reference.

In general, hand-supportable digital imaging system 1 supports both manually-triggered and automatically-triggered modes of operation, and the method of bar code symbol reading described below can be practiced using either of these triggering techniques.

In FIG. 4, the flow chart describes the method of reading bar code symbols carried out by the digital-imaging based bar code symbol reader 1 shown in FIGS. 1, 2A, 2B and 3 and described above.

As indicated at Block A in FIG. 4, the control subsystem 30 determines if an object has been detected in the field of view (FOV). When the system is operating in its manually-triggered mode, this operation can be achieved by the user pulling the manually pulling trigger switch 5A. When the system is operating in its automatically-triggered mode of operation, this operation can be achieved by the object detection subsystem automatically detecting the presence of an object within the field of view (FOV) of the system. In the event that an object is detected, then at Block B, the system control subsystem 30 enables the image formation and detection subsystem to detect and capture a digital image of the object in the FOV, using a field of visible LED-based illumination generated by illumination subsystem 22. At this stage, the object might bear a visible bar code symbol 16A and/or invisible bar code symbol 16B within the FOV of the system.

At Block C, control subsystem 30 runs a decode algorithm on the captured digital image, and if at Block D, a bar code symbol graphically represented in the digital image is decodable, then at Block E, the bar code symbol is decoded and the symbol character data is transmitted from the I/O subsystem 27 to the host system. If, however, at Block D a bar code symbol is not decodable in the digital image, then control subsystem 30 determines at Block F whether or not the maximum scan attempt threshold has been accomplished, and if not, then the system controller returns to Block B, and resumes the flow as indicated. However, if at Block F, control subsystem 30 determines that the maximum scan attempt threshold has been reached, then control subsystem 30 proceeds to Block G and captures a digital image using invisible (e.g. IR) illumination.

At Block H in FIG. 4, one or more decode algorithms are run on the captured digital image, and at Block I, the system controller determines whether or not a bar code symbol is decoded within the digital image. If at Block I a bar code symbol is decoded within the digital image, then at Block J the bar code symbol is decoded and symbol character data produced is transmitted to the host system, and system control returns to Block A, as indicated in FIG. 4. If, however, at Block I, no bar code symbol is decoded, then control subsystem 30 determines whether or not the maximum scan attempt threshold (i.e. how many attempts to decode are permitted) has been reached or attained, and so long as the maximum number has not been reached, control subsystem 30 maintains a control loop between Blocks K and G, as indicated in FIG. 4. When the maximum number of attempts to decode has been reached at Block K, then system controller sends a failure to decode notification to the operator, and the system returns to Block B, as shown in FIG. 4.

The above method of imaging-based based bar code symbol reading and control of operation is carried out in an automated manner, within the laser scanning bar code symbol reader 1, wholly transparent to the operator who is holding the system in his or her hand. By virtue of this unique method of control, the system is capable of reading both visible and invisible bar code symbols in a user-transparent manner using visible/invisible illumination switching during digital image capture and processing operations, without the complexities presented by prior art techniques and technologies.

Figure 5:
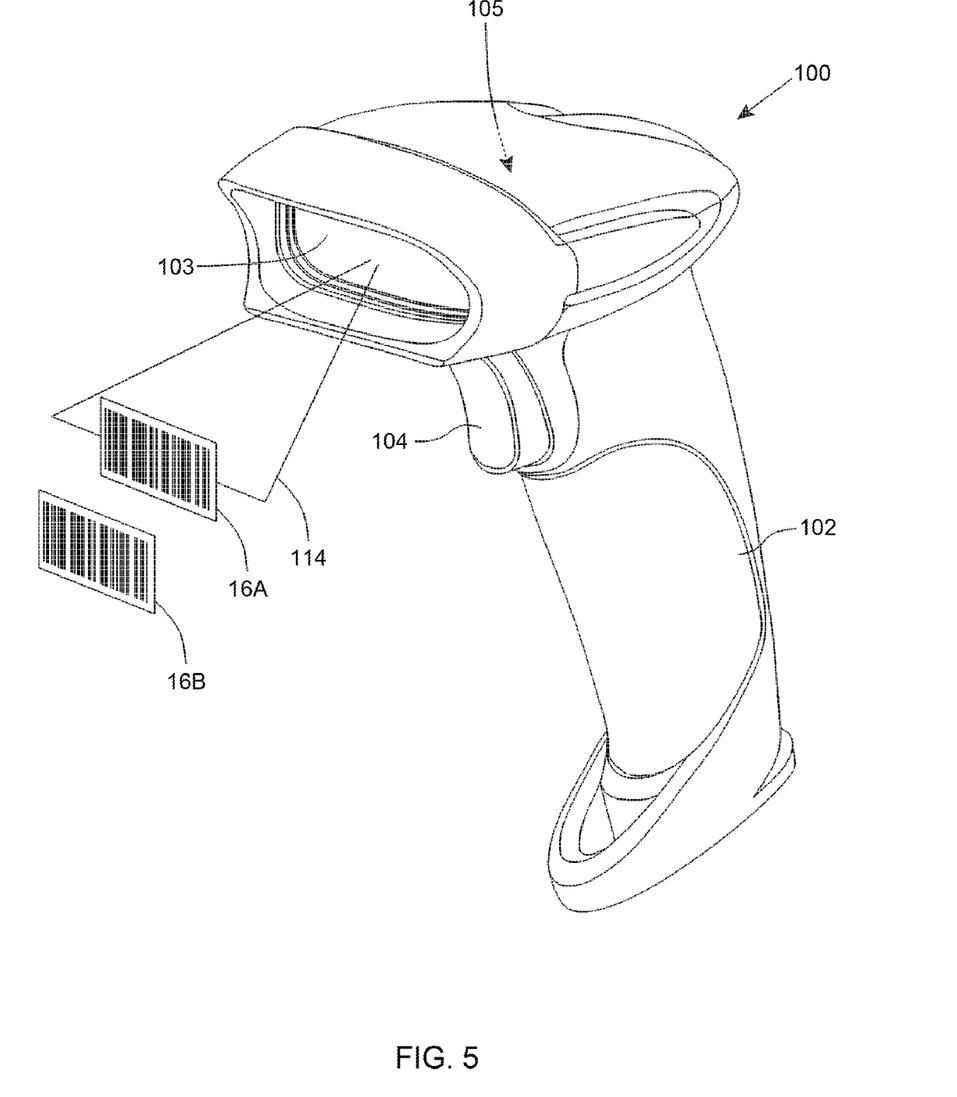
FIG. 5 is a perspective view of a hand-supportable laser scanning bar code symbol reading system of the second illustrative embodiment of the present disclosure.
Figure 6:
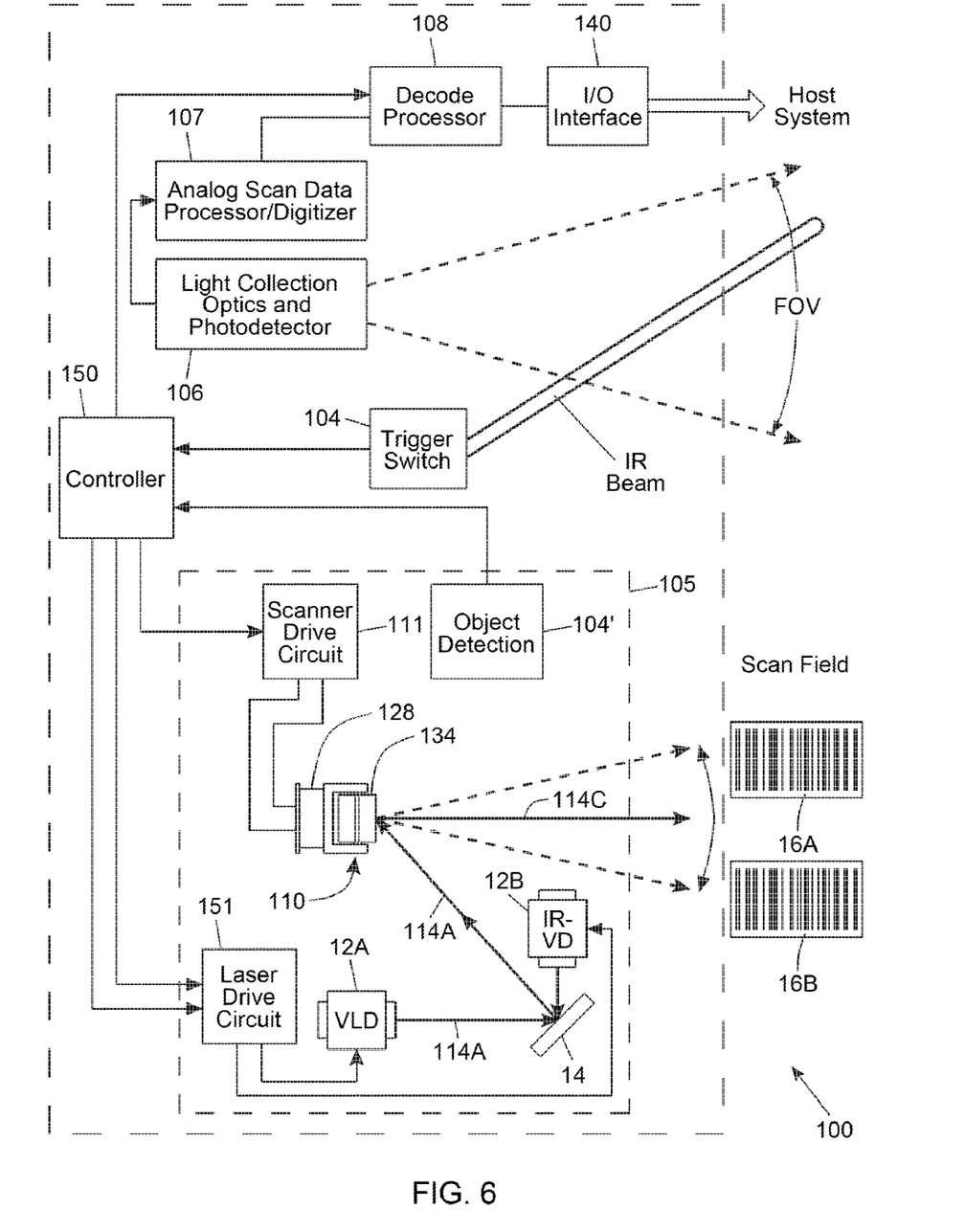
FIG. 6 is a schematic representation of the laser scanning bar code symbol reader of the second illustrative embodiment.
Figure 7:
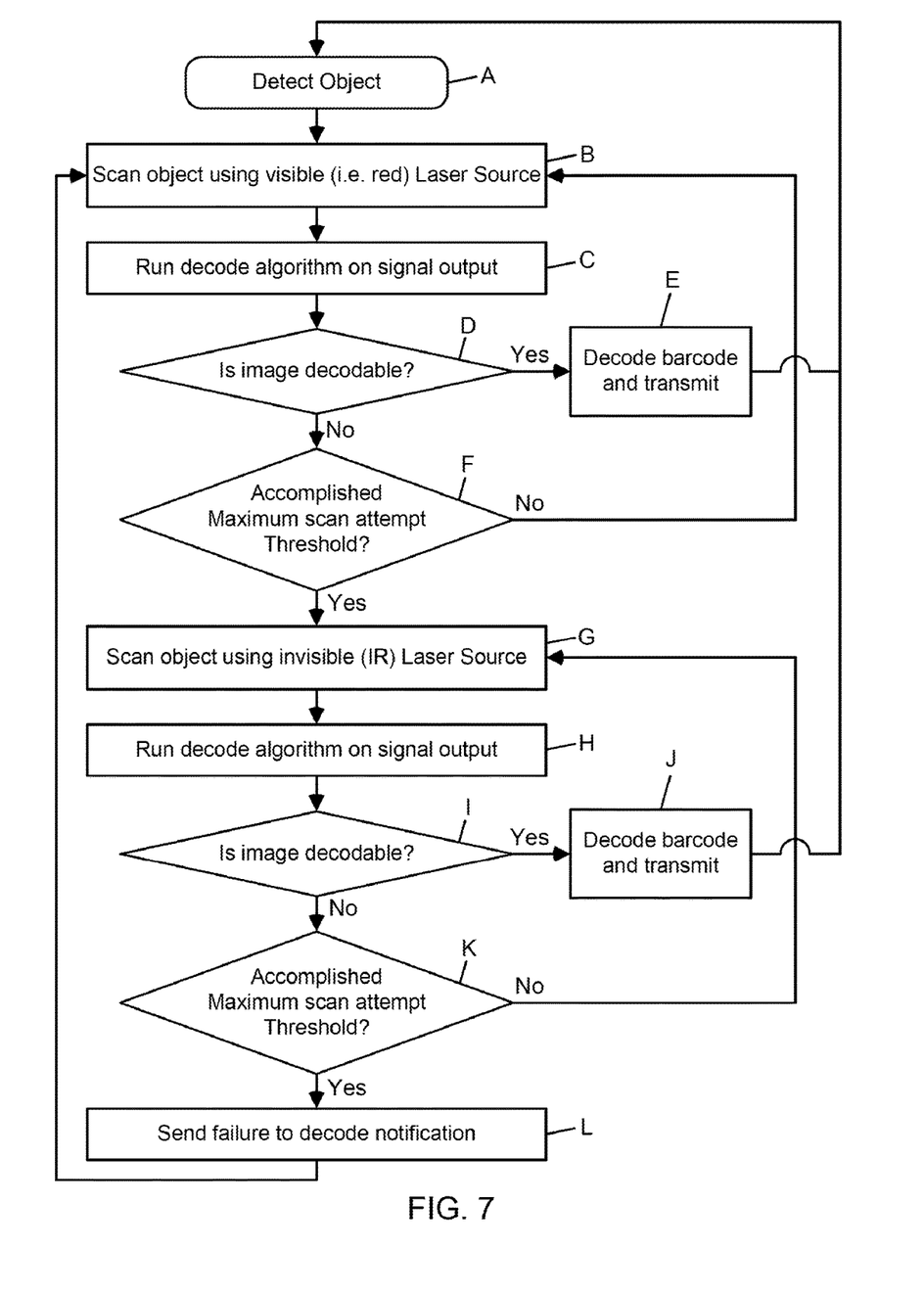
FIG. 7 is a flow chart describing the primary steps carried out in the laser scanning based bar code symbol reading system of FIG. 1, wherein visible and invisible sources of laser diode (LD) illumination are automatically and selectively employed during object illumination and imaging operations, as required to achieve the successful reading of either a visible or invisible bar code symbol within the field of view (FOV) of the system.

Hand-Supportable Laser-Scanning Bar Code Symbol Reading System of the Illustrative Embodiment As shown in FIGS. 5 and 6 the bar code symbol reader 100 comprises: a hand-supportable housing 102; a light transmission window 103 integrated with the housing 102; a manually-actuated trigger switch 104 for activating its laser scanning module 105 with a laser scanning field; an IR-based object detection circuit 104' for automatically triggering the system when an object is automatically detected in the scanning field; a multi-mode laser scanning module 110, for scanning either (i) a visible laser beam generated by a visible laser source 112A in response to a first control signal generated by a system controller 150 when the module 110 is operating in its visible illumination mode of operation, or (ii) an invisible laser beam generated by an invisible (i.e. infrared or IR) source 112B (e.g. IR laser diode or LD), in response to a second control signal generated by the system controller 150 when the module is operating in its invisible/IR illumination mode of operation, wherein the mode of operation depends on the results of real-time analysis performed by the system controller 150 while carrying out its bar code symbol reading method of operation, specified in FIG. 7; wherein the multi-mode laser scanning module 110 also includes a laser drive circuit 151 for receiving first and second control signals from system controller 150, and in response thereto, generating and delivering first and second laser (diode) drive current signals to the visible laser source 112A and the invisible/IR laser diode source 112B, respectively, to produce visible and invisible laser scanning beams alternatively during the method of bar code symbol reading described in FIG. 7; light collection optics 106 for collecting light reflected/scattered from scanned object in the scanning field, and a photo-detector for detecting the intensity of collected light and generating an analog scan data signal corresponding to said detected light intensity during scanning operations; an analog scan data signal processor/digitizer 107 for processing the analog scan data signals and converting the processed analog scan data signals into digitized data signals; programmed decode processor 108 for decode processing digitized data signals, and generating symbol character data representative of each bar code symbol scanned by either a visible or invisible laser scanning beam; an input/output (I/O) communication interface module 140 for interfacing with a host communication system and transmitting symbol character data thereto via wired or wireless communication links that are supported by the symbol reader and host system; and a system controller 150 for generating the necessary control signals for controlling operations within the hand-supportable laser scanning bar code symbol reading system.

As shown in FIG. 6, the multi-mode laser scanning module 105 comprises a number of subcomponents, namely: laser scanning assembly 110 with an electromagnetic coil 128 and rotatable scanning element 134 supporting a lightweight reflective element; a coil drive circuit 111 for generating an electrical drive signal to drive the electromagnetic coil 128 in the laser scanning assembly 110; and a visible laser beam source (visible VLD) 112*a* for producing a visible laser beam 113A and an invisible laser beam source (infrared or IR laser diode LD) 112B; and a beam deflecting mirror 114 for deflecting the laser beam 113A from either laser beam source 112A or 112B (depending on which source is enabled at any instant in time by controller 150), towards the mirror component of the laser scanning assembly 110, which sweeps the laser beam 113C across its scan field and one or more visible and/or invisible bar code symbols 16A, 16B that might be simultaneously present in such a scan field during scanning system operation.

As shown in FIG. 6, the multi-mode laser scanning module 105 is typically mounted on an optical bench, printed circuit (PC) board or other surface where the laser scanning assembly is also, and includes a coil support portion 110 for supporting the electromagnetic coil 128 (in the vicinity of the permanent magnet 134) and which is driven by a drive circuit 111 so that it generates magnetic forces on opposite poles of the permanent magnet 134, during scanning assembly operation.

In general, system 100 supports both manually-triggered and automatically-triggered modes of operation, and the method of bar code symbol reading described below can be practiced using either of these triggering techniques.

In response to a triggering event in either of the above-described modes of triggered operation, the laser scanning module 105 generates and projects a laser scanning beam through the light transmission window, and across the laser scanning field external to the hand-supportable housing, for scanning an object in the scanning field. The laser scanning beam is generated by either the visible laser beam source 112A or the invisible (IR) laser beam source 112B in response control signals generated by the system controller 150. The scanning element (i.e. mechanism) 134 repeatedly scans the visible laser beam, or invisible laser beam, depending on the state of operation at any instant in time, across any visible and/or invisible code symbols residing on the object in the laser scanning field. Then, the light collection optics 106 collects light reflected/scattered from scanned code symbols on the object in the scanning field, and the photo-detector (106) automatically detects the intensity of collected light (i.e. photonic energy) and generates an analog scan data signal corresponding to the light intensity detected during scanning operations. The analog scan data signal processor/digitizer 107 processes the analog scan data signals and converts the processed analog scan data signals into digitized data signals. The programmed decode processor 108 decode processes digitized data signals, and generates symbol character data representative of each bar code symbol scanned by either a visible or invisible laser scanning beam. Symbol character data corresponding to the visible and/or invisible bar codes read by the decoder 108, are then transmitted to the host system via the I/O communication interface 140 which may support either a wired and/or wireless communication link, well known in the art. During object detection and laser scanning operations, the system controller 150 generates the necessary control signals for controlling operations within the hand-supportable laser scanning bar code symbol reading system.

In FIG. 7, the flow chart describes the method of reading bar code symbols carried out by the laser scanning based bar coded reader 100 shown in FIGS. 5 and 6 and described above.

As indicated at Block A in FIG. 7, the system controller determines if an object has been detected in the field of view (FOV). When the system is operating in its manually-triggered mode, this operation can be achieved by the user pulling the manually pulling trigger switch 5A. When the system is operating in its automatically-triggered mode of operation, this operation can be achieved by the object detection subsystem automatically detecting the presence of an object within the field of view (FOV) of the system.

In the event that an object is detected, then the object is scanned with a beam of visible laser illumination generated by VLD 112A, at Block B.

At Block C, the system controller 150 runs a decode algorithm on the captured scan data, and if at Block D, a bar code symbol is decodable, then at Block E, the bar code symbol is decoded and the symbol character data is transmitted to the host system. If, however, at Block D a bar code symbol is not decodable, then the system controller 150 determines at Block F whether or not the maximum scan attempt threshold has been reached, and if not, then the system controller 150 returns to Block B, and resumes the flow as indicated. However, if at Block F, the system controller 150 determines that the maximum scan attempt threshold has been accomplished, then the system controller 150 proceeds to Block G and scans the object using an invisible (e.g. IR) laser illumination beam, generated by IR VD 112B.

At Block H in FIG. 7, one or more decode algorithms are run on the collected scan data, and at Block I, the system controller 150 determines whether or not a bar code symbol is decoded. If at Block I a bar code symbol is decoded, then at Block J the bar code symbol is decoded and symbol character data produced is transmitted to the host system, and system control returns to Block A, as shown in FIG. 7. If, however, at Block I, no bar code symbol is decoded, then the system controller 150 determines whether or not the maximum scan attempt threshold (i.e. how many attempts to decode are permitted) has been reached, and so long as the maximum number has not been reach, the system controller 150 maintains a control loop between Blocks K and G, as indicated in FIG. 7. When the maximum number of attempts to decode has been reached at Block K, then system controller 150 sends a failure to decode notification to the operator, and the system returns to Block B, as shown in FIG. 7.

The above method of laser scanning based bar code symbol reading and control of operation is carried out in an automated manner, within the laser scanning bar code symbol reader 100, wholly transparent to the operator who is holding the system in his or her hand. By virtue of this unique method of control, the system is capable of reading both visible and invisible bar code symbols in a user-transparent manner using visible/invisible illumination switching during digital image capture and processing operations, without the complexities presented by prior art techniques and technologies.

Some Modifications Which Readily Come To Mind

While the first illustrative embodiment disclosed the use of a 2D image detection array to detect digital images of visible and invisible bar code symbols, it is understood that 1D or linear image detection arrays can be used as well, to produce 1D digital images which are processed alone, or which are combined sequentially together to form 2D digital images prior to digital image processing.

Also, the second illustrative embodiment disclosed the use of a 1D laser scanning module to detect scan visible and/or invisible bar code symbols on objects, it is understood that a 2D or raster-type laser scanning module can be used as well, to generate scan data signals for decoding processing.

While the illustrative embodiments disclose switching sources of visible and invisible (i.e. infrared) illumination during data capture and processing operations, to read visible and/or invisible code symbols on objects in a user-transparent manner, it is understood that such illumination source switching operations can be carried out in various ways, including toggling between (i) a visible illumination source for a predetermined number of data capture (i.e. digital image frames or scan data scans) and processing operations (i.e. cycles), and (ii) an invisible illumination source for a predetermined number of data capture and processing operations, for each triggering event within the system.

Also, the illustrative embodiment have been described in connection with various types of bar code symbol reading applications involving 1-D and 2-D bar code structures, it is understood that the present invention can be used to read (i.e. recognize) any machine-readable indicia, dataform, or graphically-encoded form of intelligence, including, but not limited to bar code symbol structures, alphanumeric character recognition strings, handwriting, and diverse dataforms currently known in the art or to be developed in the future. Hereinafter, the term "code symbol" shall be deemed to include all such information carrying structures and other forms of graphically-encoded intelligence.

It is understood that the digital-imaging based bar code symbol reading system of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope of the Claims appended hereto.

The invention claimed is:

1. A system, comprising:
an imaging-based symbol reading subsystem having a field of view for reading a symbol within the field of view;
a visible illumination source for producing visible illumination within the field of view;
an invisible illumination source for producing invisible illumination with the field of view;
a control subsystem for controlling the symbol reading subsystem, the visible illumination source, and the invisible illumination source;
wherein, after a triggering event, the control subsystem initiates the production of visible illumination within the field of view by the visible illumination source and an attempt by the symbol reading subsystem to read the symbol within the field of view based on visible illumination reflected from the field of view and, if the symbol is not read the control subsystem initiates the production of visible illumination within the field of view by the visible illumination source and another attempt by the symbol reading subsystem to read the symbol within the field of view based on visible illumination reflected from the field of view; and
wherein, if the symbol is not read after a number of attempts that exceeds a maximum scan attempt threshold to read the symbol based on visible illumination reflected from the field of view, the control subsystem initiates the production of invisible illumination within the field of view by the invisible illumination source and an attempt by the symbol reading subsystem to read the symbol within the field of view based on invisible illumination reflected from the field of view.

2. The system of claim 1, comprising an object detection subsystem for detecting an object within the field of view and generating the triggering event.

3. The system of claim 1, comprising a trigger switch for generating the triggering event.

4. The system of claim 1, comprising an illumination control subsystem for controlling the duration and intensity of the illumination produced by the visible illumination source and the invisible illumination source.

5. The system of claim 1, wherein the visible illumination source comprises an array of visible LEDs.

6. The system of claim 1, wherein the invisible illumination source comprises an array of invisible LEDs.

7. The system of claim 1, comprising a hand-supportable housing containing the symbol reading system, the visible illumination source, the invisible illumination source, and the control subsystem.

8. The system of claim 1, wherein:
in response to the triggering event, the control subsystem initiates the production of visible illumination within the field of view by the visible illumination source and an attempt by the symbol reading subsystem to read the symbol within the field of view; and
after the triggering event and a number of attempts that exceeds a maximum scan attempt threshold by the symbol reading subsystem to read the symbol within the field of view illuminated by visible illumination, the control subsystem initiates the production of invisible illumination within the field of view by the invisible illumination source and an attempt by the symbol reading subsystem to read the symbol within the field of view.

9. A system, comprising:
a visible laser source for producing a visible laser beam;
an invisible laser source for producing an invisible laser beam;
a laser-based symbol reading subsystem for scanning the visible laser beam and the invisible laser beam across a scanning field and reading a symbol within the scanning field;
a control subsystem for controlling the symbol reading subsystem, the visible laser source, and the invisible laser source;
wherein, after a triggering event, the control subsystem initiates the production of the visible laser beam by the visible laser source, the scanning of the visible laser beam across the scanning field by the symbol reading subsystem, and an attempt by the symbol reading subsystem to read the symbol within the scanning field based on visible light reflected from the scanning field and, if the symbol is not read the control subsystem initiates the production of the visible laser beam by the visible laser source, the scanning of the visible laser beam across the scanning field by the symbol reading subsystem, and another attempt by the symbol reading subsystem to read the symbol within the scanning field based on visible light reflected from the scanning field; and
wherein, if the symbol is not read after a number of attempts that exceeds a maximum scan attempt threshold to read the symbol based on visible light reflected from the scanning field, the control subsystem initiates the production of the invisible laser beam by the invisible laser source, the scanning of the invisible laser beam across the scanning field by the symbol reading subsystem, and an attempt by the symbol reading subsystem to read the symbol within the scanning field based on invisible light reflected from the scanning field.

10. The system of claim 9, comprising an object detection subsystem for detecting an object within the scanning field and generating the triggering event.

11. The system of claim 9, comprising a trigger switch for generating the triggering event.

12. The system of claim 9, comprising a laser scanning module for driving the visible laser source and invisible laser source, collecting light from the scanning field, detecting the intensity of the collected light, generating a signal corresponding to the detected intensity, and generating symbol character data representative of the signal.

13. The system of claim 9, comprising a communication interface for transmitting signals to a host system.

14. The system of claim 9, comprising a hand-supportable housing containing the visible laser source, the invisible laser source, the symbol reading system, and the control subsystem.

15. The system of claim 9, wherein:
in response to the triggering event, the control subsystem initiates the production of the visible laser beam by the visible laser source, the scanning of the visible laser beam across the scanning field by the symbol reading subsystem, and an attempt by the symbol reading subsystem to read a symbol within the scanning field; and
after the triggering event, the scanning of the visible laser beam across the scanning field by the symbol reading subsystem, and a number of attempts that exceeds a maximum scan attempt threshold to read the symbol based on visible light reflected from the scanning field, the control subsystem initiates the production of the invisible laser beam by the invisible laser source, the scanning of the invisible laser beam across the scanning field by the symbol reading subsystem, and an attempt by the symbol reading subsystem to read a symbol within the scanning field.

16. A method of reading symbols, comprising:
producing visible light within a field of view;
attempting to read a symbol within the field of view while the field of view is illuminated by the visible light based on visible light reflected from the field of view;
if the attempt to read the symbol fails, producing visible light within the field of view and attempting to read a symbol within the field of view while the field of view is illuminated by the visible light based on visible light reflected from the field of view;
if the symbol is not read after a number of attempts that exceeds a maximum scan attempt threshold to read the symbol based on visible light reflected from the field of view, producing invisible light within the field of view; and
attempting to read a symbol within the field of view while the field of view is illuminated by the invisible light based on invisible light reflected from the field of view.

17. The method of claim 16, wherein the step of attempting to read the symbol within the field of view while the field of view is illuminated by the visible light comprises capturing a digital image of the field of view and processing the digital image to read the symbol within the digital image.

18. The method of claim 16, wherein the step of attempting to read the symbol within the field of view while the field of view is illuminated by the invisible light comprises capturing a digital image of the field of view and processing the digital image to read the symbol within the digital image.

19. The method of claim 16, wherein:
the step of producing visible light comprises producing a visible laser beam; and
the step of attempting to read the symbol within the field of view while the field of view is illuminated by the visible light comprises:
scanning the visible laser beam across a scanning field;
collecting light from the scanning field;
detecting the intensity of the collected light;
generating a signal corresponding to the detected intensity; and
generating symbol character data representative of the signal.

20. The method of claim 16, wherein:
the step of producing invisible light comprises producing an invisible laser beam; and
the step of attempting to read the symbol within the field of view while the field of view is illuminated by the invisible light comprises:
scanning the invisible laser beam across a scanning field;
collecting light from the scanning field;
detecting the intensity of the collected light;
generating a signal corresponding to the detected intensity; and
generating symbol character data representative of the signal.

* * * * *